(12) United States Patent
Bergsma

(10) Patent No.: US 8,588,327 B1
(45) Date of Patent: Nov. 19, 2013

(54) DIGITAL TRANSMITTER

(75) Inventor: Adrian J. Bergsma, Kanata (CA)

(73) Assignee: Apple Inc., Cupertino, CA (US)

( * ) Notice: Subject to any disclaimer, the term of this patent is extended or adjusted under 35 U.S.C. 154(b) by 907 days.

(21) Appl. No.: 12/347,760

(22) Filed: Dec. 31, 2008

Related U.S. Application Data

(60) Provisional application No. 61/009,660, filed on Dec. 31, 2007.

(51) Int. Cl.
*H04L 27/00* (2006.01)

(52) U.S. Cl.
USPC .............................. 375/295; 341/20; 341/173

(58) Field of Classification Search
USPC ........................................................ 375/219
See application file for complete search history.

(56) References Cited

U.S. PATENT DOCUMENTS

| | | | |
|---|---|---|---|
| 6,310,908 B1 | 10/2001 | Reed et al. | |
| 6,674,381 B1 * | 1/2004 | Gomez et al. | 341/143 |
| 6,987,953 B2 | 1/2006 | Morris et al. | |
| 7,081,793 B2 | 7/2006 | Morris et al. | |
| 7,130,327 B2 * | 10/2006 | Robinson et al. | 375/132 |
| 2002/0114403 A1 * | 8/2002 | Garceran et al. | 375/295 |
| 2004/0030260 A1 * | 2/2004 | Arx | 600/549 |
| 2004/0036634 A1 * | 2/2004 | Level et al. | 341/77 |
| 2004/0192229 A1 * | 9/2004 | Morris et al. | 455/91 |
| 2005/0062526 A1 * | 3/2005 | Morris et al. | 330/10 |
| 2005/0110664 A1 * | 5/2005 | Chen | 341/118 |
| 2005/0117663 A1 * | 6/2005 | Drogi et al. | 375/316 |
| 2005/0220218 A1 * | 10/2005 | Jensen et al. | 375/302 |
| 2007/0201535 A1 * | 8/2007 | Ahmed | 375/135 |
| 2009/0066549 A1 * | 3/2009 | Thomsen et al. | 341/143 |
| 2011/0051954 A1 * | 3/2011 | Thomsen et al. | 381/93 |

* cited by examiner

*Primary Examiner* — Erin File

(57) ABSTRACT

A digital transmitter includes a digital-to-digital sigma-delta modulator (SDM) receiving digital baseband data ($f_{BB}$) which sigma-delta modulates the baseband signal to generate a digital SDM signal. The digital SDM signal is digitally mixed with an oscillation signal ($f_{LO}$) to frequency shift the baseband data to $f_{LO}+/-f_{BB}$. The frequency shifted signal is filtered to remove either the upper or lower frequency band and the remaining signal is converted to an RF analog signal for eventual RF transmission. In another embodiment, the digital-to-digital SDM is a multi-level SDM that generates N parallel binary (digital) waveform signals which are each individually mixed with the oscillation signal. The resulting N frequency shifted SDM signals are summed and filtered, or in the alternative are each filtered and summed, to generate the RF analog signal.

18 Claims, 1 Drawing Sheet

DIGITAL TRANSMITTER

CROSS-REFERENCE TO RELATED APPLICATION

This application claims priority under 35 USC 119(e) to U.S. provisional Application Ser. No. 61/009,660, filed on Dec. 31, 2007, and which is incorporated herein by reference.

TECHNICAL FIELD

The present invention relates to transmitters and, in particular, to a digital transmitter for use in communications.

BACKGROUND

In most current digital wireless systems, the traditional up-conversion chain (or significant portion thereof) is primarily analog and includes types such as super-heterodyne, low intermediate frequency (IF) and zero IF up-conversion technology. These technologies start with the conversion of inherently digital signals to analog signals through high performance digital-to-analog (D/A) converters, generally due to the higher frequencies involved. Once converted to the analog domain, various combinations of analog filters, amplifiers, mixers and modulators (and perhaps other analog elements) are cascaded to achieve the up-conversion from the output of the A/D converter(s) to the radio frequency (RF) band of interest (transmit RF signal).

Component variation, tolerances, and aging all affect the design requirements, costs, and manufacturability of the analog up-conversion (transmitter) and down-conversion (receiver) chains. One digital transmitter design, as described in U.S. Pat. No. 6,987,953 which is incorporated herein by reference, reduces or eliminates some or all of these problems by utilizing digital upconversion in the digital signal processing block. However, the output frequency is linked to the digital processing clock.

Accordingly, there is needed a digital transmitter that separates the digital signal processing from the RF translation. Utilization of digital frequency translation further allows for a transmitter design without the traditional need for high quality analog components.

SUMMARY

According to the present invention, there is provided a digital transmitter including a digital-to-digital sigma delta modulator for receiving a baseband digital signal and generating a modulated digital signal, a digital mixer for mixing the modulated digital signal with a digital oscillation signal to generate a frequency shifted modulated digital signal, and a filter for receiving and filtering the frequency shifted modulated digital signal and generating an analog radio frequency (RF) signal for RF transmission.

In another embodiment of the invention, there is provided a digital transmitter including a multi-level digital-to-digital sigma delta modulator for receiving a baseband digital signal and generating N modulated digital signals, a digital mixer for mixing each of the N modulated digital signals with a digital oscillation signal to generate N frequency shifted modulated digital signals, and a summation and filtering circuit for receiving, summing and filtering the N frequency shifted modulated digital signals to generate an analog radio frequency (RF) signal for RF transmission.

In yet another embodiment, there is provided a wireless communications device including a digital transmitter and an antenna. The digital transmitter includes a digital-to-digital sigma delta modulator for receiving a baseband digital signal and generating a modulated digital signal, a digital mixer for mixing the modulated digital signal with a digital oscillation signal to generate a frequency shifted modulated digital signal, and a filter for receiving and filtering the frequency shifted modulated digital signal and generating an analog radio frequency (RF) signal for RF transmission.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

The present disclosure describes a digital transmitter within a wireless communication device in a communications system. Numerous portions or aspects of the transmitter are omitted for brevity, and only those elements or devices necessary or relevant to an understanding of the present disclosure are described or shown herein.

Figure 1:
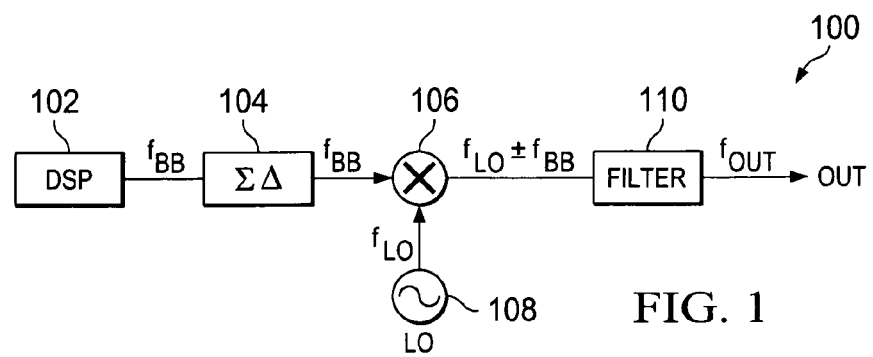
FIG. 1 is a block diagram of a portion of a digital transmitter in accordance with the present disclosure.

With reference to FIG. 1, there is shown a relevant portion of a digital transmitter 100 in accordance with the present disclosure. The transmitter 100 includes a digital signal processing or processor (DSP) core 102. The DSP core 102 generates coded I (in-phase) and Q (quadrature) digital baseband signals (in other embodiments, I and Q may not be utilized). The I and Q digital baseband signals each typically comprise a stream of samples or bits representing a digital value, or word having n bits. The baseband data signals have a baseband frequency $f_{BB}$.

As will be appreciated, the processing, generation and functionality utilized to generate the I and Q digital baseband signals that are output from the DSP core 102 are not shown or described. This is known to those of ordinary skill in the art. In general terms, the digital data is processed by encoding, interleaving, converting, and perhaps spreading (using orthogonal codes and psuedo-random (PN codes)) to generate the I and Q digital baseband signals (often referred to as samples at a particular sampling rate).

It will be understood that the modulation and/or coding scheme utilized in the present disclosure is not limited to quadrature (I and Q) modulation or coding, and other modulation or coding techniques may be utilized with modifications to the present disclosure. In addition, the I and Q baseband signals may relate to a single carrier or multiple (1 to N) carriers. Utilization of I and Q baseband signals permit zero IF upconversion which reduces distortion.

The baseband signal(s) output from the DSP core 102 is input to a sigma-delta modulator (SDM) 104. The SDM 104 is implemented as a digital-to-digital SDM that receives digital data as an input and generates a digitally coded output at a higher data rate. The sigma-delta modulated output signal is mixed digitally with a local oscillator signal at $f_{LO}$ by a digital mixer 106. A local oscillator 108 generates the oscillator signal (in binary form, referred to as "digital"). The digital mixer 106 outputs a digitally mixed output signal with the baseband data information at $f_{LO}+/-f_{BB}$. A filter 110 selects one frequency range for the output signal at $f_{out}$. The filter 110 may be analog or digitally based, such as a finite impulse response (FIR) filter. The signal $f_{out}$ from the filter 110 has the form of a high quality radio frequency (RF) signal ready for RF transmission (e.g., carrier frequency mixing, power amplification and transmission). The baseband information has been digitally translated or shifted in frequency.

It will be understood that the structure and implementation of a sigma-delta modulator (SDM) is well-known to those skilled in the art, and therefore, no specific design or implementation is described herein. The local oscillator 108 may be external (off-chip) which allows the other integrated components in the transmitter 100 to be frequency agnostic. Only the final oscillator (carrier frequency) determines the final output frequency. Therefore, the integrated circuit(s) implementing the digital transmitter 100 may be useful for radio systems at different frequencies. Further, the separation of the DSP core 102 operation and the frequency translation (digital upconversion) permits SDM signal characteristics to be optimizable independently from the RF translation.

The design of the transmitter 100 has several benefits and advantages. The entire signal chain operates at binary levels (digital). The filter 100 provides a digital to analog conversion process. The oscillator signal $f_{LO}$ is not limited to the same clock frequency used in the DSP core 102 or the SDM 104. Since the signals are binary, the digital mixer 106 does not require high linearity in order to keep distortion products minimized. Timing alignment of the signal may still be controlled by the DSP core 102. The local oscillating signal and mixer 106 are only used to frequency translate the baseband information.

Figure 2:
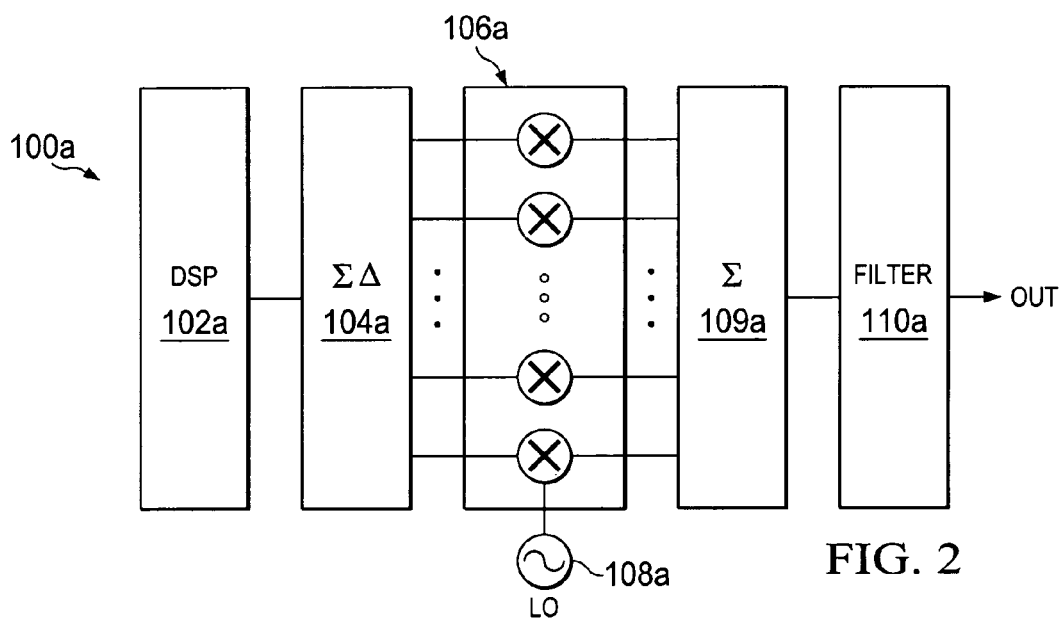
FIG. 2 is a block diagram of another embodiment of a digital transmitter.

As will be appreciated, the transmitter 100 shown in FIG. 1 illustrates a single-bit implementation, i.e., the SDM 104 output is a single-bit stream. Now referring to FIG. 2, there is illustrated a digital transmitter 100a in accordance with the present disclosure utilizing multi-level or multi-bit SDM signals. The transmitter 100a includes a DSP core 102a. The baseband signal(s) output from the DSP core 102a is input to a multi-level sigma-delta modulator (SDM) 104a. The SDM 104a is implemented as a multi-level (or multi-bit output) digital-to-digital SDM that receives digital data as an input and generates N parallel binary (e.g., +1/−1, 1/0, HMO) digitally coded outputs at a higher data rate. Each of the sigma-delta modulated output signals are individually mixed digitally with a local oscillator signal at $f_{LO}$ by a digital mixer 106a. A local oscillator 108a generates the oscillator signal (in binary form, referred to as "digital"). The digital mixer 106a outputs N frequency translated parallel binary digital signals each with baseband data information at $f_{LO}+/-f_{BB}$.

A summation circuit 109a sums together the N frequency translated parallel binary digital signals to produce a multi-level SDM signal that includes the original multi-level SDM baseband information, but with the baseband information shifted in frequency. A filter 110a selects one frequency range for the output signal at $f_{out}$. In one embodiment, the summation and filtering functions are implemented in a summation/filter circuit.

In another embodiment (not shown), the summation circuit 109a and filter 110a are replaced with a filter bank (independently filtering each of the N signals) followed by a summation circuit.

RF Communications Network

Figure 3:
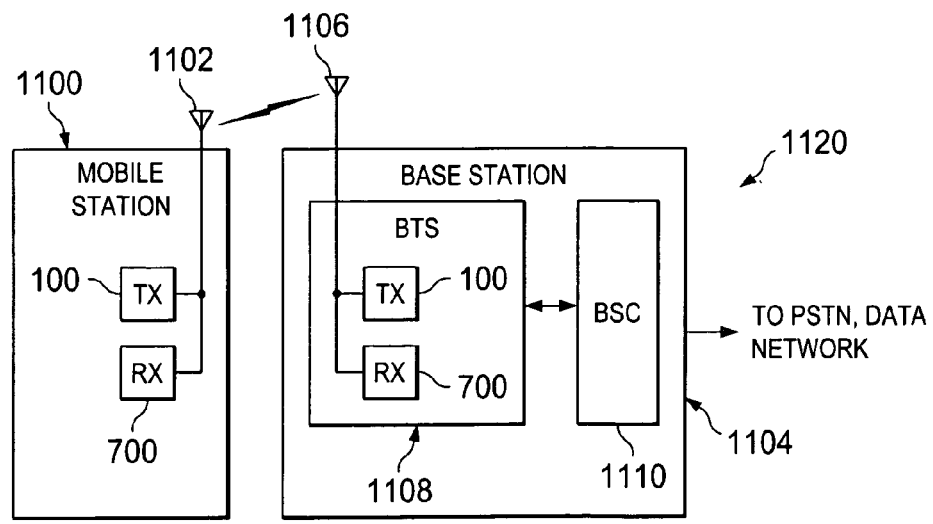
FIG. 3 illustrates an exemplary wireless communications network, including communication devices incorporating the transmitter described in the present disclosure.

Now referring to FIG. 3, there is illustrated a block diagram of an exemplary wireless communications network 1120. The wireless communications network 1120 includes a first wireless communications device 1100 and a second wireless communications device 1104. The first wireless communications device 1100 is shown including the transmitter 100 as described above and in accordance with the present disclosure. Similarly, the second wireless communications device 1104 includes the transmitter 100 as described above and in accordance with the present disclosure. Each of the devices 1102 and 1120 include a receiver 700 (these may be similar or different). It will be understood it is not necessary for both of the devices 1100 and 1104 to include the transmitter 100—either one or both may include the transmitter 100.

The two communications devices 1100 and 1104 communicate via RF signals utilizing an antenna 1102 and an antenna 1106, respectively, as shown.

The exemplary wireless communications network 1120 may operate in accordance with one or more wireless protocols or technologies, such as CDMA, TDMA, FDMA, UMTS, etc. (and versions thereof). Further, the network 1120 may support circuit-switched, and packet-switched or packet data communications.

In the embodiment in FIG. 3, the first communications device 1100 is illustrated as a mobile station or mobile terminal (or possibly fixed), such as a wireless handset, while the second communications device 1104 is illustrated as a base station, though not limited to such embodiment. The devices 1100, 1104 may be any device having wireless communications capabilities. As shown, the base station 1104 includes a base transceiver subsystem (BTS) 1108 that includes the transmitter 100. The BTS 1108 is connected to a base station controller (BSC) 1110. Collectively, the BTS 1108 and the BSC 1110 are logically referred to as the "base station" 1104. Multiple BTS 1108 sometimes share one BSC 1110. The BSC 1110 manages resource allocation among the several BTSs. More generally, the terms "base station" and "access network" refer to any entity (or collection of entities) that communicates wirelessly with mobile stations for communications sessions (e.g., circuit-switched or packet-switched). The base station 1104 is coupled to the public switched telephone network (PSTN) or other data or switched network. This path may include additional elements such as a mobile switching center (MSC) (not shown) coupled to the BSC 1110.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A digital transmitter, comprising:
   a digital-to-digital sigma delta modulator configured to receive a baseband digital signal including an in-phase (I) signal and a quadrature (Q) signal, and wherein the signal delta modulator is configured to generate a single modulated digital signal;
   a digital mixer configured to mix the modulated digital signal with a digital oscillation signal to generate a frequency shifted modulated digital signal; and
   a filter configured to filter the frequency shifted modulated digital signal and generate an analog radio frequency (RF) signal for RF transmission.

2. The digital transmitter of claim 1, further comprising:
   a digital signal processor (DSP) configured to generate the baseband digital signal.

3. The digital transmitter of claim 2, wherein the digital oscillation signal has a clock frequency different from a clock frequency used in the DSP.

4. The digital transmitter of claim 2, wherein the DSP, the digital-to-digital sigma delta modulator, and the digital mixer are integrated on one or more integrated circuits, and wherein the digital oscillation signal is generated externally from the one or more integrated circuits.

5. The digital transmitter of claim 1, wherein the filter includes a finite impulse response (FIR) filter.

6. The digital transmitter of claim 5, wherein the filter is configured to provide a digital to analog conversion process.

7. A digital transmitter, comprising:
   a plurality of multi-level digital-to-digital sigma delta modulators, at least two of which are configured to receive a baseband digital signal and generate N modulated digital signals;
   a digital mixer configured to mix the N modulated digital signals with a digital oscillation signal to generate N frequency shifted modulated digital signals; and
   a summation and filtering circuit configured to sum and filter the N frequency shifted modulated digital signals to generate an analog radio frequency (RF) signal for RF transmission.

8. The digital transmitter of claim 7, further comprising:
   a digital signal processor (DSP) configured to generate the baseband digital signals.

9. The digital transmitter of claim 8, wherein the digital oscillation signal has a clock frequency different from a clock frequency used in the DSP.

10. The digital transmitter of claim 8, wherein the DSP, the plurality of multi-level digital-to-digital sigma delta modulators, and the digital mixer are integrated on one or more integrated circuits, and wherein the digital oscillation signal is generated externally from the one or more integrated circuits.

11. The digital transmitter in of claim 7, wherein each of the baseband digital signals includes a respective in-phase (I) signal and a respective quadrature (Q) signal.

12. The digital transmitter of claim 7, wherein the filter includes a finite impulse response (FIR) filter.

13. The digital transmitter of claim 12, wherein the filter provides a digital to analog conversion process.

14. A wireless communications device, comprising:
   a digital transmitter, wherein the digital transmitter includes:
      a multi-level digital-to-digital sigma delta modulator configured to receive a baseband digital signal and generate a plurality of modulated digital signals, wherein the baseband digital signal includes an in-phase (I) signal and a quadrature (Q) signal;
      a digital mixer configured to mix the plurality of modulated digital signals with a digital oscillation signal to generate a plurality of frequency shifted modulated digital signals;
      a filter configured to filter the plurality of frequency shifted modulated digital signal and generate an analog radio frequency (RF) signal; and
   an antenna coupled to the digital transmitter, wherein the antenna is configured to transmit the RF signal.

15. The wireless communication device of claim 14, wherein the digital transmitter further includes a digital signal processor (DSP) configured to generate the baseband digital signal.

16. The wireless communication device of claim 15, wherein the digital oscillation signal has a clock frequency different from a clock frequency used in the DSP.

17. The wireless communication device of claim 15, wherein the DSP, the plurality of digital-to-digital sigma delta modulators, and the digital mixer are integrated on one or more integrated circuits, and wherein the digital oscillation signal is generated externally from the one or more integrated circuits.

18. The wireless communication device of claim 14, wherein the wireless communication device is a mobile station or a base station.

* * * * *